(12) United States Patent
Kim et al.

(10) Patent No.: US 11,400,435 B2
(45) Date of Patent: Aug. 2, 2022

(54) HYDROFINISHING CATALYST AND METHOD FOR PRODUCING BASE OIL USING SAME

(71) Applicants: SK Innovation Co., Ltd., Seoul (KR); SK Lubricants Co., Ltd., Seoul (KR)

(72) Inventors: Dokyoung Kim, Daejeon (KR); Seonju Lim, Daejeon (KR); Dowoan Kim, Daejeon (KR); Seungwoo Lee, Daejeon (KR); Yoonkyung Lee, Daejeon (KR)

(73) Assignees: SK Innovation Co., Ltd., Seoul (KR); SK Lubricants Co., Ltd., Seoul (KR)

(*) Notice: Subject to any disclaimer, the term of this patent is extended or adjusted under 35 U.S.C. 154(b) by 0 days.

(21) Appl. No.: 17/289,891

(22) PCT Filed: Oct. 31, 2019

(86) PCT No.: PCT/KR2019/014535
§ 371 (c)(1),
(2) Date: Apr. 29, 2021

(87) PCT Pub. No.: WO2020/091437
PCT Pub. Date: May 7, 2020

(65) Prior Publication Data
US 2022/0023839 A1    Jan. 27, 2022

(30) Foreign Application Priority Data

Nov. 2, 2018 (KR) .................. 10-2018-0133597

(51) Int. Cl.
| | | |
|---|---|---|
| *B01J 23/44* | (2006.01) | |
| *B01J 21/12* | (2006.01) | |
| *B01J 23/42* | (2006.01) | |
| *B01J 35/10* | (2006.01) | |
| *C10G 69/02* | (2006.01) | |
| *C10M 177/00* | (2006.01) | |
| *C10M 101/02* | (2006.01) | |
| *C10N 70/00* | (2006.01) | |

(52) U.S. Cl.
CPC .............. *B01J 23/44* (2013.01); *B01J 21/12* (2013.01); *B01J 23/42* (2013.01); *B01J 35/1061* (2013.01); *B01J 35/1066* (2013.01); *C10G 69/02* (2013.01); *C10M 101/02* (2013.01); *C10M 177/00* (2013.01); *C10G 2300/4006* (2013.01); *C10G 2300/4012* (2013.01); *C10G 2300/4018* (2013.01); *C10G 2400/10* (2013.01); *C10M 2203/1006* (2013.01); *C10N 2070/00* (2013.01)

(58) Field of Classification Search
CPC ... B01J 23/44; B01J 21/12; B01J 23/42; B01J 35/1061; B01J 35/1066; C10G 69/02; C10G 2300/4006; C10G 2300/4012; C10G 2300/4018; C10G 2400/10; C10M 101/02; C10M 177/00; C10M 2203/1006; C10N 2070/00
See application file for complete search history.

(56) References Cited

U.S. PATENT DOCUMENTS

| | | |
|---|---|---|
| 6,995,112 B2 | 2/2006 | Timken et al. |
| 7,410,566 B2 | 8/2008 | Vaarkamp et al. |
| 7,737,074 B2 | 6/2010 | Smegal et al. |
| 8,114,806 B2 | 2/2012 | Bhan et al. |
| 8,128,805 B2 | 3/2012 | Vaarkamp |
| 8,911,613 B2 | 12/2014 | Noh et al. |
| 9,944,863 B2 | 4/2018 | Zhang et al. |
| 2011/0079540 A1 | 4/2011 | Krishna et al. |
| 2017/0306244 A1* | 10/2017 | Hensley .................. C10L 1/04 |

FOREIGN PATENT DOCUMENTS

| | | | |
|---|---|---|---|
| JP | 2003531002 A | 10/2003 | |
| JP | 2006505403 A | 2/2006 | |
| JP | 2017518171 A | 7/2017 | |
| KR | 1020050008672 A | 1/2005 | |
| KR | 1020090025346 A | 3/2009 | |
| KR | 1020120006429 A | 1/2012 | |
| KR | 1020140034177 A | 3/2014 | |
| KR | 101796782 B1 | 11/2017 | |
| KR | 102009364 B1 | 8/2019 | |
| WO | WO-2004043882 A2 * | 5/2004 | .............. C10G 11/04 |
| WO | WO-2012134484 A1 * | 10/2012 | .......... B01J 35/1042 |

OTHER PUBLICATIONS

Ali et al., "Development of heavy oil hydrocracking catalysts using amorphous silica-alumina and zeolites as catalyst supports", Applied Catalysis, 2002, pp. 77-90, A: General 233, Elsevier.

* cited by examiner

*Primary Examiner* — Ellen M McAvoy
*Assistant Examiner* — Chantel L Graham
(74) *Attorney, Agent, or Firm* — The Webb Law Firm

(57) ABSTRACT

A hydrofinishing catalyst according to the present invention includes an amorphous silica-alumina support; and a hydrogenated active metal supported on the support, and has an Al composition having a total mass (wt %) of Al and Si as a denominator and a mass (wt %) of Al as a numerator with respect to a reference line, which is a straight line passing through the center of a cross-section of the support, locations evenly spaced apart along the reference line are sequentially numbered, where composition uniformity, which is defined as UN by the Al composition at the i-th location and an average Al composition at the cross-section of the support passing through the center of the support, is 3.0 or less.

8 Claims, 3 Drawing Sheets

HYDROFINISHING CATALYST AND METHOD FOR PRODUCING BASE OIL USING SAME

CROSS-REFERENCE TO RELATED APPLICATIONS

This application is the United States national phase of International Application No. PCT/KR2019/014535 filed Oct. 31, 2019, and claims priority to Korean Patent Application No. 10-2018-0133597 filed Nov. 2, 2018, the disclosures of which are hereby incorporated by reference in their entirety.

BACKGROUND OF THE INVENTION

Field of the Invention

The present invention relates to a hydrofinishing catalyst having an improved catalytic ability and a method for producing base oil using the same.

Description of Related Art

Unconverted oil refers to an unconverted oil fraction separated as a bottom product remaining after producing fuel oil through a hydrocracking reaction in a hydrocracking process. Such unconverted oil may be used as a raw material for producing high quality base oil (Groups II and III according to the American Petroleum Institute (API) classification).

As a method for providing a feedstock for producing base oil using unconverted oil, which is an unconverted heavy oil fraction remaining, to fuel oil in a fuel oil hydrocracking process according to the related art, the method of Korean Patent Publication No. 96-13606, that is, a method for efficiently producing a feedstock for producing fuel oil and high quality base oil by reducing loads in a first vacuum distillation process (atmospheric residue vacuum distillation process) and a hydrotreating and hydrocracking reaction process without recycling unconverted oil (UCO) to the first vacuum distillation process by directly taking out UCO in a recycle mode operation of a vacuum gas oil (VGO) fuel oil hydrocracking process and providing the taken-out UCO as a feedstock for producing fuel oil, is known. Accordingly, it is possible to produce a feedstock for producing high quality base oil having a viscosity grade of 100 N or 150 N while significantly eliminating inefficiency.

However, UCO used as a feedstock for producing base oil contains a lot of impurities. Among the impurities, a polynuclear aromatic compound may cause turbidity of a color of a base oil product, may cause deterioration of stability, and may deactivate a catalyst in a process of producing base oil due to its action as a coke precursor. In addition, the polynuclear aromatic compound may also negatively affect a catalyst in a hydrocracking process when recycling UCO and distilled water. In general, several ppm to thousands ppm of polynuclear aromatic compounds may be present in the UCO.

In order to remove the polynuclear aromatic compound in the UCO, in the related art, a hydrogenation process (hydrotreating process) has been generally introduced prior to a hydroisomerization reaction process (dewaxing process) of the process of producing base oil. In the hydrogenation process, impurities such as sulfur and nitrogen in the feedstock are removed and the polynuclear aromatic compound which may act as a coke precursor is saturated to protect a catalyst supporting noble metals in the subsequent hydroisomerization reaction process.

However, in the technology for producing base oil according to the related art, a technology for preventing deterioration of a hydroisomerization catalyst or a hydrotreating catalyst, improving a yield and efficiency in the dewaxing process, and constructing and operating a low-cost process, a technology for managing properties of a raw material to be injected in the hydrotreating process, and the like have been mainly studied. Meanwhile, studies on a hydrofinishing process for improving stability and controlling a color, gas absorptivity, and the like are relatively insufficient.

SUMMARY OF THE INVENTION

Technical Problem

An object of the present invention is to provide a hydrofinishing catalyst having a significantly improved color improvement ability and a method for producing base oil using the same.

Technical Solution

In one general aspect, a hydrofinishing catalyst contains: an amorphous silica-alumina support; and a hydrogenated active metal supported on the support, wherein composition uniformity defined as the following Expression 1 satisfies Expression 2, $$UN = \frac{\sum_{i=1}^{i=M} |C_{Al}(i) - C_{Al}(ave)|}{M \times C_{Al}(ave)} \times 100 \quad \text{(Expression 1)}$$

in Expression 1, UN is composition uniformity, $C_{Al}$ is an Al composition having a total mass (wt %) of Al and Si as a denominator and a mass (wt %) of Al as a numerator, $C_{Al}(ave)$ is an average Al composition on a cross section of a support passing through the center of the support, $C_{Al}(i)$ is an Al composition at an i-th position of positions spaced apart from each other by a predetermined interval along a reference line and sequentially numbered, the reference line being a straight line passing through the center of the cross section of the support, and M is a total number of positions at which the Al composition is measured at the reference line, and is a natural number of 20 to 500, $$UN \leq 3.0. \quad \text{(Expression 2)}$$

According to an embodiment of the present invention, the hydrofinishing catalyst may satisfy the following Expression 3, $$5.00 \leq Pv(100-500)/Pv(10-500)*100 \quad \text{(Expression 3)}$$

in Expression 3, Pv(10–500) is a total volume (cm³/g) of pores within a size range of 10 to 500 nm per unit mass of the catalyst, and Pv(100–500) is a total volume (cm³/g) of pores within a size range of 100 to 500 nm per unit mass of the catalyst.

According to an embodiment of the present invention, the hydrofinishing catalyst may satisfy the following Expression 4, (Expression 4)
Amount of Bronsted acid sites measured by adsorption of pyridine at 200° C. ≥30 μmol/g.

According to an embodiment of the present invention, the hydrofinishing catalyst may satisfy the following Expression 5, Expression 6, or Expressions 5 and 6, (Expression 5)

Amount of Bronsted acid sites measured by adsorption of pyridine at 300° C.≥25 μmol/g, (Expression 6)

Amount of Bronsted acid sites measured by adsorption of pyridine at 400° C.≥10 μmol/g.

According to an embodiment of the present invention, in the hydrofinishing catalyst, the active metal may be one or two or more metals belonging to Groups VI to VIII.

According to an embodiment of the present invention, in the hydrofinishing catalyst, the active metal may contain Pd, Pt, or Pd and Pt.

According to an embodiment of the present invention, the hydrofinishing catalyst may contain a first active metal and a second active metal, and a weight ratio of the first active metal to the second active metal may be 1.0:0.1 to 1.0.

According to an embodiment of the present invention, the hydrofinishing catalyst may contain 0.1 to 5 wt % of the active metal.

In another general aspect, there is provided a method for producing base oil using the hydrofinishing catalyst.

According to an embodiment of the present invention, the method for producing base oil may include: a step of dewaxing raw oil for producing base oil in the presence of an isomerization catalyst to obtain a catalytic dewaxed oil fraction; and a step of hydrofinishing the catalytic dewaxed oil fraction using the hydrofinishing catalyst to produce base oil.

Advantageous Effects

The hydrofinishing catalyst according to an embodiment of the present invention has excellent composition uniformity, such that the hydrofinishing catalyst may have a significantly improved color improvement ability even in the same amounts of Bronsted acid sites, specifically, a significantly excellent ability for removing a polycyclic aromatic compound, and the hydrofinishing catalyst may remove the polycyclic aromatic compound having a high concentration in a short time.

DESCRIPTION OF THE INVENTION

Figure 1:
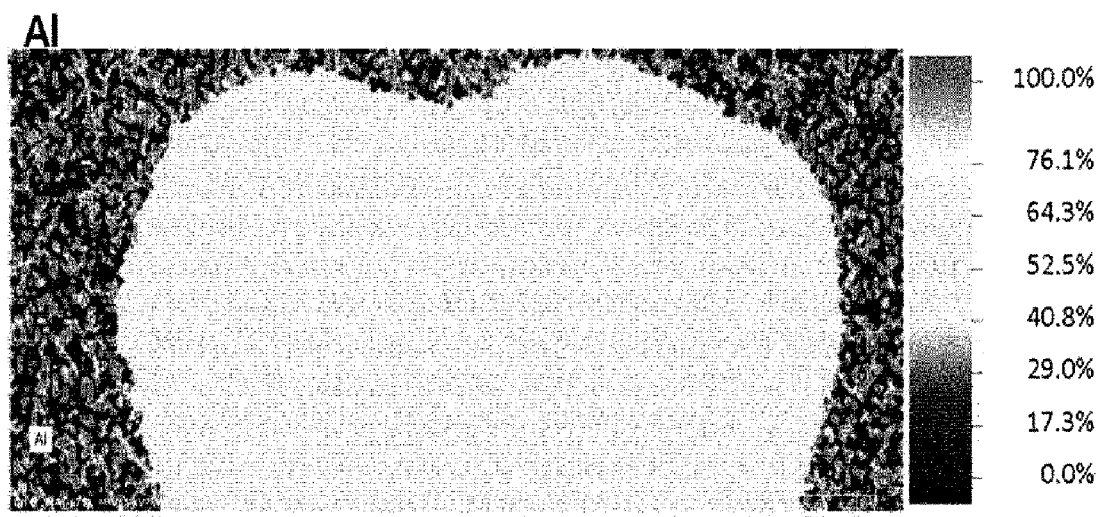
FIG. 1 is a view illustrating a result of energy dispersive spectrometry (EDS) mapping of Al on a cross section of the center of an amorphous silica-alumina support (support A) selected in Example 1.

Hereinafter, a hydrofinishing catalyst according to an embodiment of the present invention and a method for producing base oil using the same will be described in detail. However, technical terms and scientific terms used herein have the general meanings understood by those skilled in the art to which the present invention pertains unless otherwise defined, and a description for the known function and configuration unnecessarily obscuring the gist of the present invention will be omitted in the following description.

As a result of conducting long-term and in-depth studies to produce high quality base oil, the present applicant found that a degree of a color improvement in a process of hydrofinishing a raw material containing a sulfur compound and a nitrogen compound, that is, a conversion ability of saturating a polycyclic aromatic compound and converting the saturated polycyclic aromatic compound to a polycyclic compound, is directly affected by not only an active metal material of a catalyst or a density of acid (solid acid) sites contained in the catalyst but also composition uniformity of a support providing acid sites. As a result of conducting further in-depth studies based on these findings, the present applicant confirmed that in a case where a composition of the support was very uniform, a catalytic ability (color improvement ability) of the catalyst was significantly improved, a conversion ability (color improvement ability) was significantly improved without deterioration, heavy polynuclear aromatics (HPNAs) having, particularly, 6 or more rings were very effectively saturated, and very rapid HPNA hydrogenation was performed, thereby completing the present invention.

The hydrofinishing catalyst according to the present invention based on the above findings is a hydrofinishing catalyst containing an amorphous silica-alumina support, and a hydrogenated active metal supported on the support, wherein composition uniformity defined as the following Expression 1 satisfies Expression 2, $$UN = \frac{\sum_{i=1}^{i=M} |C_{Al}(i) - C_{Al}(ave)|}{M \times C_{Al}(ave)} \times 100 \quad \text{(Expression 1)}$$

$$UN \leq 3.0. \quad \text{(Expression 2)}$$

in Expression 1, UN is composition uniformity, $C_{Al}$ is an Al composition having a total mass (wt %) of Al and Si as a denominator and a mass (wt %) of Al as a numerator, $C_{Al}(ave)$ is an average Al composition on a cross section of a support passing through the center of the support, $C_{Al}(i)$ is an Al composition at an i-th position of positions spaced apart from each other by a predetermined interval along a reference line and sequentially numbered, the reference line being a straight line passing through the center of the cross section of the support, and M is a total number of positions at which the Al composition is measured at the reference line, and is a natural number of 20 to 500.

In the catalyst according to the present invention, UN defined as Expression 1 may be preferably 2.5 or less, more preferably 2.3 or less, and still more preferably 2.1 or less. In this case, UN may exceed 0 and may be substantially 0.01 or more, but is not limited thereto. When UN is preferably 2.5 or less, more preferably 2.3 or less, and still more preferably 2.1 or less, a catalytic ability may be very significantly improved even in the same amounts of Bronsted acid sites.

In Expression 1, at least one of $C_{Al}(i)$'s (i is a natural number of 1 to M) may be an Al composition at a position belonging to the central region of a cross section of the support (hereinafter, referred to as a support cross section), and at least one of $C_{Al}(i)$'s may also be an Al composition at a position belonging to an edge region of the support cross section.

Based on a radius (Rr) of the support cross section from the center of the support along a radius direction, the central region may refer to a region within 0.01 to 0.20 Rr, and specifically within 0.05 to 0.15 Rr, from the center of the support cross section along the radical direction. In this case, a shape of the central region may correspond to a shape of the support cross section. That is, the central region may have a shape corresponding to the shape of the support cross section reduced by 0.01 to 0.20 Rr, and specifically by 0.05 to 0.15 Rr, based on a length.

Since the support is porous, there is a risk that a mounting material intrudes into an edge of the support at the time of mounting for fixing the support, which may cause a risk of inaccuracy in composition analysis due to the mounting material. Therefore, the edge region is preferably a region adjacent to an edge of the support cross section as much as possible so that the edge region may be free from contamination with the mounting material and may represent a degree of composition uniformity in a substantially entire region of the support cross section, while excluding the edge of the support cross section contaminated with the mounting material. In this regard, based on the radius (Rr) of the support cross section from the center of the support along the radius direction, the edge region may refer to a region within 0.70 Rr to 0.95 Rr, and specifically within 0.75 Rr to 0.85 Rr, from the center of the support cross section along the radical direction.

A predetermined interval between the positions (positions at which the composition is measured) spaced apart from each other on the reference line by a predetermined interval may correspond to a value obtained by dividing a distance between the edge region and the central region by M. As a substantial example, the predetermined interval may be 1 to 20 μm, as a more substantial example, the predetermined interval may be 1 to 10 μm, and as a still more substantial example, the predetermined interval may be 2 to 8 μm, but the present invention is not limited thereto.

In addition, although UN relates to the composition uniformity of aluminum, since the support is an amorphous silica-alumina support and the Al composition is a composition having a total content (wt %) of Al and Si as a denominator and a content (wt %) of Al as a numerator, the composition uniformity of Al may correspond to composition uniformity of Si.

As described above, in a case where the support in the catalyst has extremely uniform composition uniformity satisfying Expression 2, even when the catalyst has the same hydrogenated active metals, the same contents of the active metals, and the same kinds and amounts of acid sites, the catalyst may have a significantly improved conversion ability (color improvement ability). In a case where the catalyst has UN of preferably 2.5 or less, more preferably 2.3 or less, and still more preferably 2.1 or less, UN being defined as Expression 1, heavy polynuclear aromatics (HPNAs) having, particularly, 6 or more rings may be effectively saturated.

Experimentally, in Expression 1, the Al composition ($C_{Al}$) may be calculated based on a result of energy dispersive spectrometry (EDS). Specifically, $C_{Al}$(ave) may be a value calculated by element mapping in the entire region of the cross section of the support (region encompassing the edge region and the central region described above, but excluding a portion contaminated with the mounting material), and $C_{Al}(i)$ may be calculated based on a result of measuring the positions spaced apart from each other by a predetermined interval at the line profile of the Al composition according to the reference line on the cross section of the support. In the energy dispersive spectrometry, a working distance (WD) may be 10.8 mm, an accelerating voltage may be 5 kV, an electron beam size may be 0.4 nA, and a scanning rate may be 0.2 mm/msec. These results may be obtained by performing tens to hundreds of repeated measurements.

The hydrofinishing catalyst according to an embodiment of the present invention may further satisfy the following Expression 3, $$5.00 \leq Pv(100-500)/Pv(10-500)*100 \quad \text{(Expression 3)}$$

in Expression 3, Pv(10–500) is a total volume (cm³/g) of pores within a size (diameter) range of 10 to 500 nm per unit mass of the catalyst, and Pv(100–500) is a total volume (cm³/g) of pores within a size (diameter) range of 100 to 500 nm per unit mass of the catalyst.

A fraction (Pv(100–500)/Pv(10–500)*100 defined in Expression 3) of the pores within the size range of 100 to 500 nm may be specifically 6.00 or more, and more specifically, 6.50 or more, and may be substantially 10.00 or less.

In addition, it is preferable that the hydrofinishing catalyst satisfies Expression 3, and a value of Pv(10–500) according to the definition of Expression 3 is 0.007 cm³/g or more, specifically, 0.007 to 0.05 cm³/g, and more specifically, 0.009 to 0.05 cm³/g.

The fraction of the pores within the size range of 100 to 500 nm described above and the pore volume enable HPNAs having, particularly, 6 or more rings to smoothly move so as to more efficiently and quickly remove the polynuclear aromatic compound, which is preferable.

In this case, the pore volume per unit mass according to the pore size (diameter) in Expression 3, and a BET specific surface area, an average pore size, and the like described below may be calculated by analyzing results of an adsorption amount with respect to a relative pressure using nitrogen adsorption-desorption isotherms obtained by performing experiments at −196° C. according to Brunauer Emmett Teller (BET) or Barrett-Joyner-Halenda (BJH).

Preferably, the hydrofinishing catalyst according to an embodiment of the present invention may further satisfy Expression 4, while satisfying the composition uniformity described above.

Expression 4: Amount of Bronsted acid sites measured by adsorption of pyridine at 200° C.≥30 μmol/g, specifically, ≥35 μmol/g, more specifically, ≥38 μmol/g, and still more specifically, ≥40 μmol/g In this case, an upper limit of the amount of Bronsted acid sites in Expression 4 may be 200 μmol/g, but is not limited thereto.

Expression 4 may mean that the amount of Bronsted acid sites is 30 μmol/g or more, specifically, 35 μmol/g or more, more specifically, 38 μmol/g or more, and still more specifically, 40 μmol/g or more, the Bronsted acid site being in an active state and present on a surface of the catalyst (including a pore surface of an open pore) on which adsorption of pyridine may occur, in a state in which the temperature of the catalyst is increased to 200° C.

In a case where the catalyst satisfies the composition uniformity described above and has the amount of Bronsted acid sites satisfying Expression 4, hydrogenation of HPNA may be smoothly performed even under a condition in which a high content of HPNA is very quickly supplied.

More preferably, the hydrofinishing catalyst according to an embodiment of the present invention may have a strength of a Bronsted acid site satisfying Expression 5, Expression 6, or Expressions 5 and 6, while satisfying the composition uniformity described above and having the amount of Bronsted acid sites satisfying Expression 4.

Expression 5: Amount of Bronsted acid sites measured by adsorption of pyridine at 300° C.≥25 µmol/g, specifically, ≥28 µmol/g, more specifically, ≥30 µmol/g, and still more specifically, ≥31 µmol/g Expression 6: Amount of Bronsted acid sites measured by adsorption of pyridine at 400° C.≥10 µmol/g, specifically, ≥12 µmol/g, more specifically, ≥14 µmol/g, and still more specifically, ≥15 µmol/g In this case, an upper limit of the amount of Bronsted acid sites in Expression 5 or Expression 6 may be 150 µmol/g, but is not limited thereto.

Expression 5 or Expression 6 represents a change in the amount of Bronsted acid sites which are present on the surface of the catalyst and are in an active state depending on an increase in temperature, and represents a strength of a Bronsted acid site.

The temperatures (200° C. to 400° C.) in Expression 4 to Expression 6 may correspond to a process temperature in an actual hydrofinishing process, and Expression 4 to Expression 6 may correspond to an index for estimating the amount and strength of a Bronsted acid site which is significant (in an active state) and present in the catalyst in the actual hydrofinishing process.

According to an embodiment of the present invention, in a case where the catalyst has a strength of a Bronsted acid site satisfying Expression 5, Expression 6, or Expressions 5 and 6, while having the composition uniformity described above, preferably, UN of 2.5 or less, and having the amount of Bronsted acid sites satisfying Expression 4, even when the hydrofinishing process is performed under a condition in which a raw material contains an extremely high content of HPNA and a very fast liquid hourly space velocity condition advantageous for mass production, and under a hydrofinishing temperature, hydrogen/raw material volume ratio, and hydrogen pressure that are advantageous for commercial production, it is possible to produce a product (for example, base oil) satisfying Saybolt color=30 and ultraviolet absorbance at 325 nm≤0.20, and substantially, ultraviolet absorbance at 325 nm≤0.15.

As a specific example, it is possible to produce a raw material containing 1,700 to 1,900 ppm (wt ppm) of a polycyclic aromatic compound having 6 or more rings, 7 wt ppm of a sulfur compound, and 5 wt ppm of a nitrogen compound, and to produce a product satisfying Saybolt color=30 and ultraviolet absorbance at 325 nm≤0.20, and substantially, ultraviolet absorbance at 325 nm≤0.15 even under process conditions of a hydrogen pressure of 160 Kgf/cm$^2$, a liquid hourly space velocity (LHSV) of 1.7 hr$^{-1}$, a H$_2$/raw material volume ratio (m$^3$/m$^3$) of 500, a hydrofinishing temperature of 220° C., and a catalyst amount of 50 to 60 ml.

In a case of experimentally more clearly confirming and verifying a catalytic ability (color improvement ability) of the catalyst according to an embodiment of the present invention, in the raw material under the process condition, Group III base oil according to API regulations may be mixed with the polycyclic aromatic compound to a concentration (a concentration of the polycyclic aromatic compound) of 1,700 to 1,900 ppm (wt ppm). In addition, the polycyclic aromatic compound may be HPNA which is a polycyclic aromatic compound having 6 or more rings, and HPNA may be a polycyclic aromatic compound having 6 rings to 30 rings.

However, the raw material which is a mixture of Group III base oil and HPNA specifies a raw material used in the case of confirming and verifying a catalytic ability (color improvement ability), and the raw material which is the mixture of Group III base oil and HPNA should not be limited to and interpreted as a raw material to be subjected to hydrofinishing by the catalyst. As a substantial example, since a representative process in which the hydrofinishing process is used is a process of producing base oil, the raw material to be subjected to hydrofinishing by the catalyst may be a product in a dewaxing process (specifically, dewaxing oil) or the like.

In this case, experimentally, the Saybolt color may be measured based on ASTM 156, and the ultraviolet absorbance may be measured based on ASTM D2008.

Contents of the raw material and various aromatics in the product may be precisely measured through a result of ultraviolet absorbance at a wavelength of 200 nm to 500 nm, and in particular, a value of ultraviolet absorbance at a wavelength of 325 nm is a value that best represents a content of the polycyclic aromatic compound having a great influence on colors of the raw material and the product.

The amount of Bronsted acid sites measured by adsorption of pyridine based on infrared spectroscopy may be measured and calculated with reference to a well known literature ['Determination of Integrated Molar Extinction Coefficients for Infrared Absorption Bands of Pyridine Adsorbed on Solid Acid Catalysts', Journal of Catalysis, 141, 347-354 (1993)]. Specifically, concentrations and acid strength distributions of Bronsted acids and Lewis acids may be confirmed through Fourier-transform infrared spectroscopy (FT-IF) analysis of adsorption of pyridine which is a basic probe molecule. In the FT-IR analysis, 30 mg of a sample is palletized to prepare pellets having a diameter of 1.3 cm, a vacuum is pulled to 10$^{-6}$ Torr, a pre-treatment is performed at 500° C. for 3 hours to remove water molecules and the like, and a background analysis is performed for each temperature for measuring the amount of acid sites after the pre-treatment. Liquid pyridine is injected using a syringe, a stabilization time is allowed for 30 minutes, and then a sample spectrum at each temperature at which the background is obtained is scanned. Wavelength regions corresponding to acid sites are 1) a pyridine adsorbed on Bronsted acid site of 1,540 to 1,545 cm$^{-1}$ and a pyridine adsorbed on Lewis acid site of 1,450 to 1,455 cm$^{-1}$, and each of the amounts of acid sites is calculated by integrating each of peaks in the corresponding regions. Integrated molar extinction coefficient (IMEC) values used in the calculation in the analysis of the amount of acid sites are IMEC (Bronsted acid) of 1.67 cm/µmol and IMEC (Lewis acid) of 2.22 cm/µmol.

In the catalyst according to an embodiment of the present invention, the support is sufficient as long as it has a specific surface area and size of a support of a hydrofinishing catalyst known in the related art.

As a specific example, a BET specific surface area of the support may be 100 to 800 m²/g, and more specifically, 200 to 600 m²/g, but is not limited thereto.

As another specific example, the support may be a porous support, and specifically, may be a porous support having an average pore size of 30 nm to 100 nm, but is not limited thereto.

As still another specific example, the support may have a diameter on the order of tens of micrometers to several millimeters, and as an example, the support may have a diameter of 30 μm to 5 mm, 30 to 500 μm, or 500 μm to 2 mm, but the present invention is not limited thereto.

In addition, the support may be formed in a particle shape, an aggregate (granule, secondary particle) shape, a honeycomb shape, a cylindrical shape, a pellet shape, a spherical shape, or a deformed cylindrical shape having three-leaf or four-leaf cross section, but is not limited thereto.

Any support may be used as long as it is amorphous silica-alumina satisfying the composition uniformity described above, and preferably amorphous silica-alumina satisfying the Bronsted acid site conditions (Expressions 4, 5, and 6) described above in a state in which an active metal is supported, while satisfying the composition uniformity described above. However, since the amount of Bronsted acid sites may be influenced by a composition of silica-alumina, as a substantial example, the amount of $Al_2O_3/(Al_2O_3+SiO_2)$ contained in the support may be 50% to 70%, and more specifically, 55% to 65%, based on a mass of the support, but is not limited thereto.

In the hydrofinishing catalyst according to an embodiment of the present invention, any hydrogenated active metal may be used as long as it is a metal used as an active metal for hydrogenation in the hydrofinishing process according to the related art.

Specifically, the hydrogenated active metal may be one or two or more metals belonging to Groups VI to VIII, and more specifically, may be one or two or more metals belonging to Groups VI and VIII.

As a substantial example, the active metal may be one or two or more metals selected from Fe, Ru, Os, Co, Rh, Ir, Ni, Pd, Pt, Mo, W, and Cr, and the active metal more substantially may include one or two or more noble metals selected from Pt, Rh, Pd, and Ir, and still more substantially may include Pt and Pd.

When the active metal is two or more metals, a weight ratio of a first active metal (for example, Pd) to a second active metal (for example, Pt) may be 1:0.1 to 1.0, and specifically, 1:0.2 to 0.5, but is not limited thereto.

The hydrofinishing catalyst may contain 0.1 to 5.0 wt % of the active metal, and specifically, may contain 0.3 to 3.0 wt % of the active metal. When the catalyst contains 0.1 to 3.0 wt % of the active metal, the hydrogenation by the active metal may be smoothly and stably performed, while minimizing a loss of the Bronsted acid site, which is preferable. However, the present invention is not limited to this content.

The present invention includes a method for producing a hydrofinishing catalyst.

The method for producing a hydrofinishing catalyst may include: a step of selecting a silica-alumina support having the amount of Bronsted acid sites satisfying Expression 4 described above (selection step); a step of repeatedly performing a unit process on the selected silica-alumina support by performing a water-containing methane reduction heat treatment and a subsequent oxidation heat treatment as a single unit process (homogenization step); and a step of supporting a hydrogenated active metal on the support subjected to the repeated unit process to produce a catalyst (supporting step).

Specifically, the support selection step may include: a step of primarily selecting supports having the amount of Bronsted acid sites satisfying Expression 4 from supports belonging to a group to be selected; and a step of secondarily selecting supports having the amount of Bronsted acid sites satisfying Expression 5, Expression 6, or Expressions 5 and 6 described above from the primarily selected supports.

That is, the support selection step may include a step of selecting supports having the amount of Bronsted acid sites which is greater than or equal to a reference value suggested as Expression 4 based on 200° C. from supports belonging to a group to be selected, and preferably may include a step of selecting supports having the amount of Bronsted acid sites which is greater than or equal to a reference value suggested as Expression 4 based on 200° C., as a primary selection step, and a step of secondarily selecting supports having the amount of Bronsted acid sites which is greater than or equal to a reference value suggested as Expression 5, Expression 6, or Expressions 5 and 6 from the primarily selected supports.

As the support belonging to the group to be selected, any amorphous silica-alumina support which is well known and used in a catalyst in a hydrofinishing process when producing base oil may belong to the group to be selected. However, substantially, the support belonging to the group to be selected may be an amorphous silica-alumina support in which $Al_2O_3/(Al_2O_3+SiO_2)$ is contained in an amount of 50% or more, and specifically, 50% to 70%, based on the mass of the support.

It is confirmed through the previous experiment that a value of UN of each of the selected amorphous silica-alumina supports satisfying the Bronsted acid site conditions suggested through Expressions 4, 5, and 6 in advance is in a range of 3.5 to 7.0.

After the selection of the amorphous silica-alumina support satisfying the Bronsted acid site conditions is performed, the homogenization step for improving composition uniformity of the selected support may be performed.

The homogenization step may be a step of repeatedly performing a unit process 3 to 5 times by performing, as a single unit process, a step of reducing and heat-treating the selected amorphous silica-alumina support under a methane atmosphere at a temperature of 400 to 550° C. for 1 to 2 hours and a step of performing an oxidation heat treatment on the reduced and heat-treated support under an oxidizing atmosphere (for example, oxygen atmosphere) at a temperature of 350 to 450° C. for 1 to 3 hours.

A support having composition uniformity satisfying Expression 2 may be produced by repeatedly performing the unit process described above.

A hydrofinishing catalyst may be produced by performing homogenization on a support and then supporting a hydrogenated active metal on the homogenized support. The hydrogenated active metal to be supported is similar to or identical to the active metal in the catalyst described above.

Any method used for supporting a metal on a support in the field of catalyst production may be used for supporting the active metal. As a representative example, the active metal may be supported on the support using an impregnation method of impregnating a support with an active metal precursor solution and performing a heat treatment to produce a catalyst, or the like.

As a specific example, the supporting of the active metal may include: a step of impregnating a support with a mixed solution including an active metal precursor solution and a pH adjuster (for example, ammonium hydroxide or the like); and a step of heat-treating the support impregnated with a metal precursor to produce a support supporting an active metal (hydrofinishing catalyst).

An active metal precursor may be one or two or more selected from nitrate, ammonium nitrate, halide, acetate, sulfate, acetoacetate, fluoroacetoacetate, perchlorate, sulfamate, stearate, phosphate, carbonate, oxalate, and a complex compound of a metal for each active metal, but is not limited thereto. A concentration of the active metal precursor in the mixed solution and a mixing amount of the active metal precursor with the support may be adjusted within a range in which a catalyst supporting the active metal may be produced at a desired wt %. The pH adjuster may be added so that a pH of the mixed solution is 9 to 11, but the present invention is not limited thereto. In addition, aging may be simultaneously performed in the impregnation step described above. The aging may be a step of stirring the support in contact with the mixed solution (support mixed with the mixed solution) for a predetermined time, and specifically, may be a step of rolling the support for 3 to 6 hours. In this case, a solvent such as water may be additionally added so that the support may be maintained in a wet state during the rolling.

The heat treatment may be performed in a temperature range of 200 to 700° C., and more substantially, 250 to 400° C., to prevent excessive aggregation and coarsening of metal particles. The heat treatment may be performed in an inert atmosphere or the atmosphere.

However, as described above, any method known to be used to support a metal having a catalytic ability according to the related art on a ceramic-based support may be used as a method of supporting the active metal, and the present invention may not be limited by a specific method of supporting an active metal.

The present invention includes a method for producing base oil using the hydrofinishing catalyst.

The method for producing base oil according to an embodiment of the present invention includes: a step of dewaxing raw oil for producing base oil in the presence of an isomerization catalyst to obtain a catalytic dewaxed oil fraction; and a step of hydrofinishing the catalytic dewaxed oil fraction using the hydrofinishing catalyst to produce base oil.

Raw oil for producing base oil may be hydrocarbon oil containing a polycyclic aromatic compound and n-paraffin, and as a specific example, the raw oil may include unconverted oil, hydrotreated deasphalted oil, or a mixture thereof, and the like.

Unconverted oil may include not only unconverted oil itself discharged from a hydrocracker, but also distilled unconverted oil obtained by distilling the unconverted oil discharged from the hydrocracker. The hydrocracker may include a low-pressure hydrocracker, a high-pressure hydrocracker, a single-stage hydrocracker, a dual-stage hydrocracker, and the like, and unconverted oil may also include a mixture of unconverted oil discharged from hydrocrackers different from each other.

Hydrotreated deasphalted oil may be obtained through a step of producing deasphalted oil (DAO) by removing asphalt and impurities from atmospheric residue, vacuum residue, or a mixture thereof through a well known process such as a solvent deasphalting process, and a step of hydrotreating the produced deasphalted oil in the presence of a hydrogenation catalyst to produce hydrotreated deasphalted oil. In this case, the hydrotreatment is a process for removing or reducing impurities to improve properties, and may include a hydrodesulfurization reaction, hydrodenitrogenation reaction, hydrometallation reaction, hydrodearomatization reaction, and/or hydrogenation of an unsaturated compound. The hydrotreated deasphalted oil may be obtained by a method known in the related art, and as an example, Korean Patent No. 10-1654412 may be referred to.

A step of producing a catalytic dewaxed oil fraction may be performed by using a known isomerization catalyst (hydroisomerization catalyst) under a known process condition when producing base oil according to the related art. As an example, the isomerization catalyst may contain a metal active component for hydrogenation/dehydrogenation reactions and a support having an acid site for a skeletal isomerization reaction through carbonium ions. As a substantial example, the support in the isomerization catalyst may be a support of a molecular sieve, alumina, silica-alumina, or the like, and the molecular sieve may contain crystalline aluminosilicate (zeolite), silicoaluminophosphate (SAPO), aluminophosphate (ALPO), and the like. The active metal in the isomerization catalyst may be a metal selected from Groups II, VI, VIII, IX, and X of the periodic table and having a hydrogenation function, and as a substantial example, the active metal may be Co, Ni, Pt, Pd, Mo, W, or the like. As an example, the catalytic dewaxing process may be performed under conditions of a reaction temperature of 250 to 410° C., a reaction pressure of 30 to 200 kgf/cm$^2$, a liquid hourly space velocity (LHSV) of 0.1 to 3.0 hr$^{-1}$, and a volume ratio of hydrogen to a feedstock of 150 to 1,000 m$^3$/m$^3$. However, as described above, the isomerization catalyst and the dewaxing conditions used for the dewaxing process in the production of base oil according to the related art may be used, and the present invention is not limited by the catalyst and the process conditions used in the dewaxing process.

The hydrofinishing step may be performed by using the hydrofinishing catalyst described above. The hydrofinishing process may be performed at a pressure (hydrogen pressure) of 100 to 200 Kgf/cm$^2$, a liquid hourly space velocity (LHSV) of 0.5 to 2.0 hr$^{-1}$, a H$_2$/raw material volume ratio (m$^3$/m$^3$) of 200 to 1,000, and a temperature of 200 to 280° C., but the present invention is not limited thereto. In the hydrofinishing process, the catalyst may be a molded body having a honeycomb shape, a cylindrical shape, a pellet shape, a spherical shape, or a deformed cylindrical shape having three-leaf or four-leaf cross section, but the present invention is not limited thereto. The amount of catalyst used in the hydrofinishing step may be appropriately adjusted in consideration of a process scale.

EXAMPLE 1

An amorphous silica-alumina support (support A) having the amount of Bronsted acid sites of 42.1 μmol/g at 200° C., the amount of Bronsted acid sites of 32.8 μmol/g at 300° C., and the amount of Bronsted acid sites of 16.1 μmol/g at 400° C. was selected and used. The amount of Al$_2$O$_3$/(Al$_2$O$_3$+SiO$_2$) in the support A was 59.9% based on wt %. FIG. 1 is a view illustrating a result of energy dispersive spectrometry (EDS) mapping on a cross section of the support A. In this case, the cross section of the support was a cross section in which the center of the support was exposed. The entire region of the cross section and a reference line from one edge of the cross section to the center of the support were set, and then, an EDS analysis was performed on positions spaced apart from each other by an interval of 4.7 μm with respect to the entire reference line excluding an edge (length of 100 µm) contaminated with a mounting material. In the EDS analysis, a working distance (WD) was 10.8 mm, an accelerating voltage was 5 kV, an electron beam size was 0.4 nA, and a scanning rate was 0.2 mm/msec. The analysis was repeatedly performed 300 times.

Figure 2:
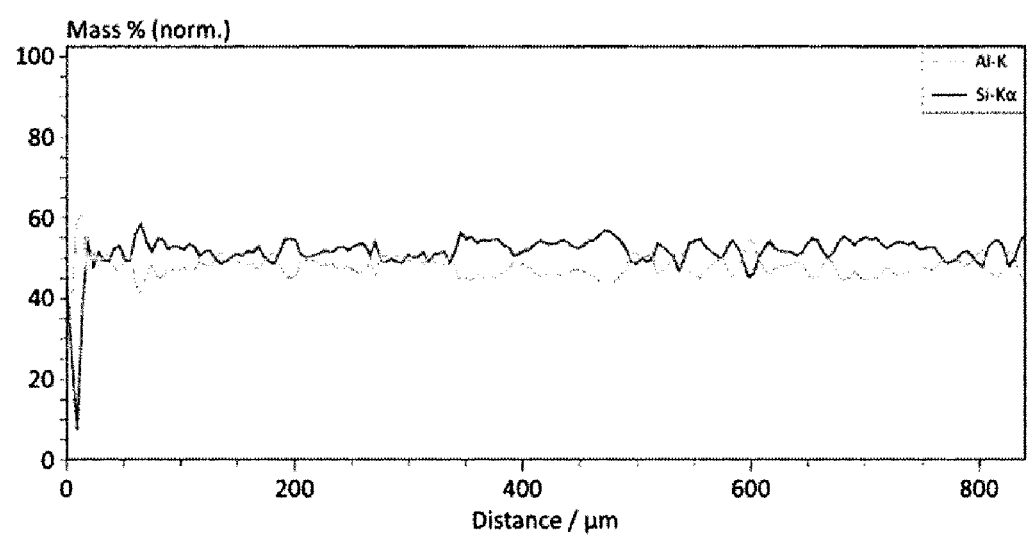
FIG. 2 is a view illustrating results of line profiles according to a reference line of the support (support A) selected in Example 1, in which light gray and dark gray represent a result of Al and a result of Si, respectively.
Figure 2:

FIG. 2 is a view illustrating line profiles of EDS performed on the support A along the reference line. As a result of the EDS analysis, a value of UN was 3.8.

A unit process of reducing and heat-treating the support A under a water-containing methane atmosphere ($H_2O$:methane:argon molar ratio=0.01:1:15) at 500° C. for 2 hours and performing an oxidation heat treatment on the reduced and heat-treated support under an oxygen atmosphere at 400° C. for 3 hours was repeatedly performed 5 times. In this case, the unit process was performed at atmospheric pressure.

Figure 3:
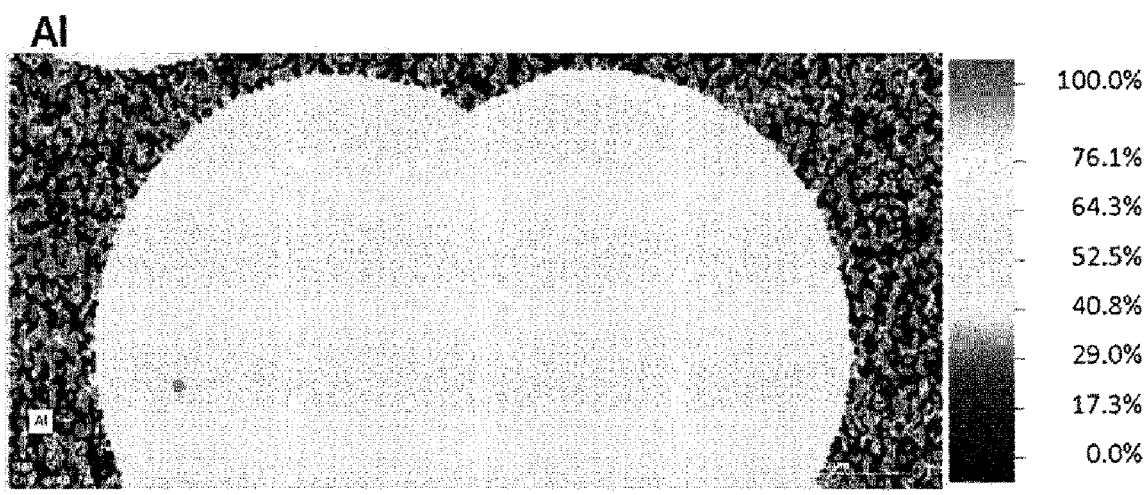
FIG. 3 is a view illustrating a result of EDS mapping of Al on a cross section of the center of a support subjected to a homogenization treatment in Example 1.
Figure 4:
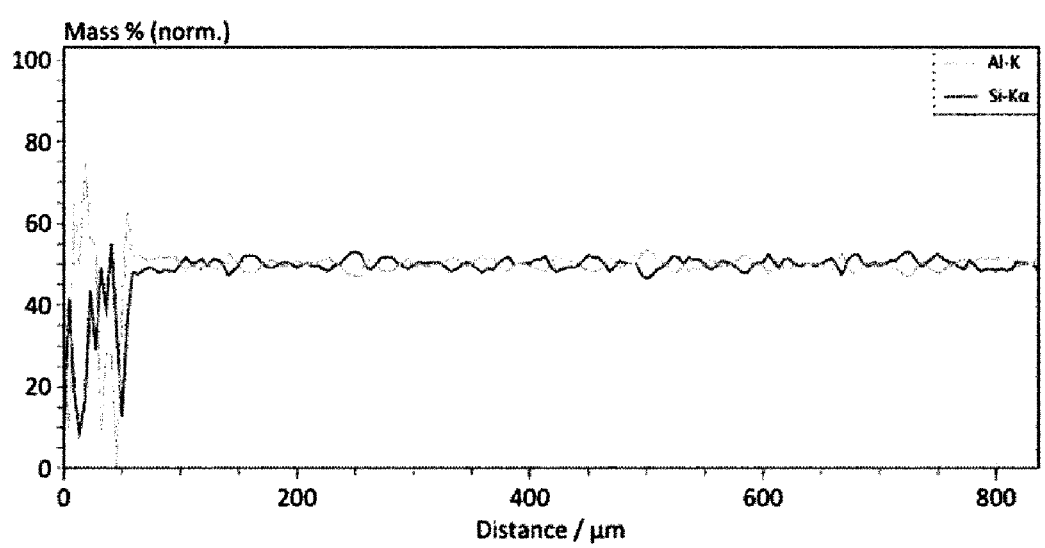
FIG. 4 is a view illustrating results of line profiles according to a reference line after the homogenization treatment in Example 1, in which light gray and dark gray represent a result of Al and a result of Si, respectively.
Figure 4:

FIG. 3 is a view illustrating a result of EDS mapping on a cross section of the center of a support subjected to a homogenization treatment. As a result of analyzing the cross section of the center of the support subjected to the homogenization treatment under the same conditions as those of the EDS analysis conditions before the homogenization treatment, a value of UN at M of 171 was 2.09. FIG. 4 is a view illustrating line profiles of EDS performed on the support A subjected to the homogenization treatment along the reference line. It was confirmed through FIGS. 2 and 4 that the composition uniformity was significantly improved.

Figure 5:
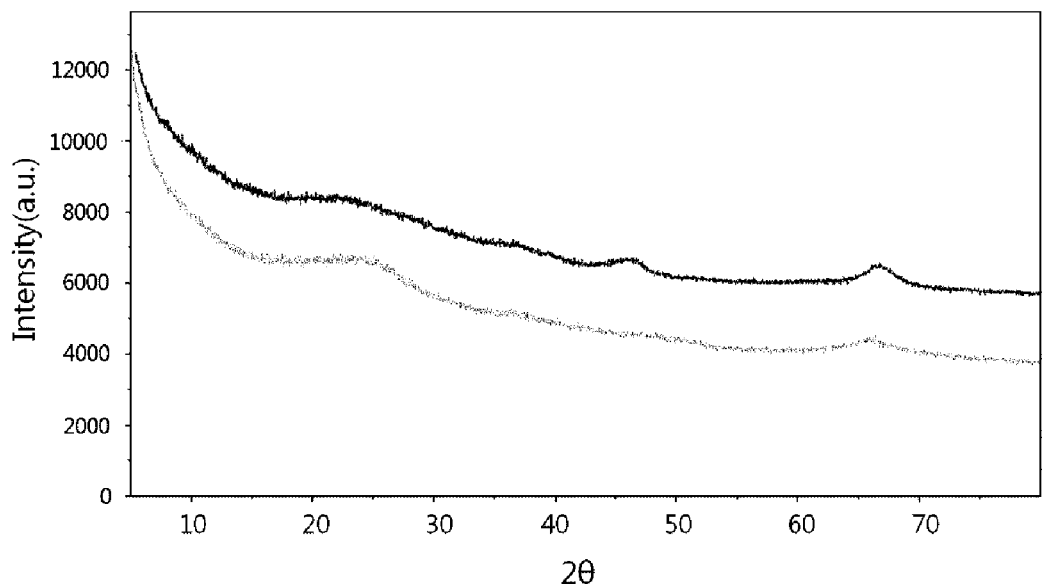
FIG. 5 is a view illustrating results of X-ray diffraction analysis of the support selected in Example 1 (dark gray) and the support subjected to the homogenization treatment in Example 1 (light gray).

FIG. 5 is a view illustrating results of Cu Kα X-ray diffraction analysis of the support before and after the homogenization treatment, in which dark gray represents the support before the homogenization treatment, and light gray represents the support after the homogenization treatment. As illustrated in FIG. 5, it was confirmed that after the homogenization treatment, a peak of γ-alumina appeared at about 2θ of 46.5° disappeared, and an amorphous peak near 2θ of 25° was relatively large.

In addition, as a result of calculating a pore size distribution in the support before and after the homogenization treatment using a gas adsorption method, it was confirmed that a value of Pv(100–500)/Pv(10–500)*100 was about 7.18, and Pv(100–500) was maintained at 0.012 cm³/g, regardless of the homogenization treatment.

Thereafter, Pd and Pt were loaded on the support subjected to the homogenization treatment to produce a hydrofinishing catalyst.

Specifically, a precursor aqueous solution in which a Pt ammonium nitrate precursor and a Pd ammonium nitrate precursor were dissolved was prepared so that a metal Pt/Pd mass ratio was 0.375, and a pH of the precursor aqueous solution was adjusted to 9.8 by adding ammonia water to the precursor aqueous solution, thereby preparing a mixed solution.

The prepared mixed solution and the homogenized support were added to a sealed container, the mixed solution and the support were mixed with each other so that a ratio of a total mass of Pd and Pt to a mass of the support in the added mixed solution was 0.0055:1, and rolling was performed for 4 hours. Thereafter, a heat treatment was performed in the atmosphere at 330° C. for 5 hours to produce a hydrofinishing catalyst (catalyst A).

As a result of measuring a Bronsted acid site of the produced catalyst (catalyst A), it was confirmed that a catalyst having the amount of Bronsted acid sites of 41.8 µmol/g at 200° C., the amount of Bronsted acid sites of 32.2 µmol/g at 300° C., and the amount of Bronsted acid sites of 15.8 µmol/g at 400° C. was produced.

For testing a catalytic ability, a raw oil sample obtained by mixing Group III base oil with 1,800 ppm of HPNA having 6 rings to 30 rings was produced, and hydrofinishing was performed by using 55 ml of the produced catalyst under conditions of a hydrogen pressure of 160 Kgf/cm², a liquid hourly spaced velocity (LHSV) of 1.7 hr⁻¹, a $H_2$/raw material volume ratio (m³/m³) of 500, and a hydrofinishing process temperature of 220° C., 230° C., or 240° C. A Saybolt color, ultraviolet absorbance at 325 nm, and aromatic compound detection results of the product produced by the hydrofinishing are summarized and shown in Table 1.

COMPARATIVE EXAMPLE 1

A hydrofinishing catalyst (catalyst B) was produced by loading Pd and Pt on the support A in the same manner as that of Example 1, except that the homogenization treatment was not performed in Example 1. As a result of measuring the amount of Bronsted acid sites of the produced catalyst (catalyst B) at each of 200° C., 300° C., and 400° C., it was confirmed that the amount of Bronsted acid sites of the catalyst B for each temperature was substantially similar to that of the catalyst A. The hydrofinishing was performed by using the produced catalyst (catalyst B) in the same manner as that of Example 1. The results thereof are summarized and shown in Table 1.

COMPARATIVE EXAMPLE 2

Figure 6:
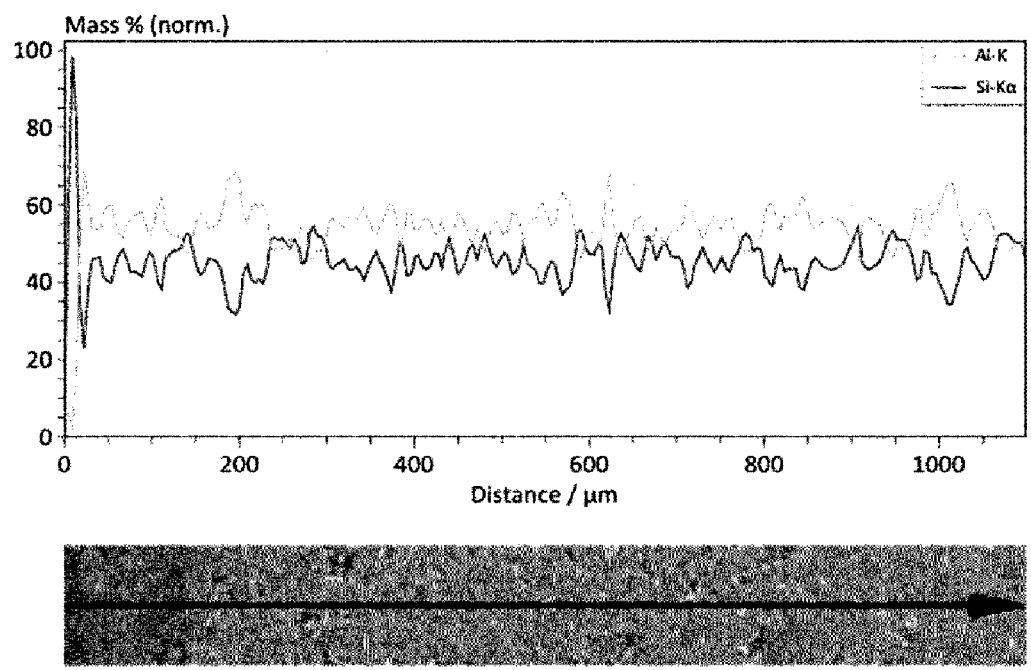
FIG. 6 is a view illustrating results of line profiles according to a reference line on a cross section of the center of an amorphous silica-alumina support (support C) selected in Comparative Example 2, in which light gray and dark gray represent a result of Al and a result of Si, respectively.

An amorphous silica-alumina support (support C) having the amount of Bronsted acid sites of 45.3 µmol/g at 200° C., the amount of Bronsted acid sites of 26.1 µmol/g at 300° C., and the amount of Bronsted acid sites of 12.5 µmol/g at 400° C. was selected. The EDS analysis was performed on a cross section of the support C in the same manner as that of Example 1. FIG. 6 is a view illustrating line profiles of EDS performed on the support C along the reference line. As a result of the EDS analysis, a value of UN of the support C was 6.53. A hydrofinishing catalyst (catalyst C) was produced by loading Pd and Pt on the support C in the same manner as that of Example 1. The hydrofinishing was performed by using the produced catalyst (catalyst C) in the same manner as that of Example 1. The results thereof are summarized and shown in Table 1.

TABLE 1

|  | Process temperature | Saybolt color | UV absorbance at 325 nm |
|---|---|---|---|
| Example 1 | 220° C. | 30 | 0.11 |
| Example 1 | 230° C. | 30 | 0.12 |
| Example 1 | 240° C. | 30 | 0.12 |
| Comparative Example 1 | 220° C. | 30 | 0.28 |
| Comparative Example 1 | 230° C. | 29 | 0.43 |
| Comparative Example 1 | 240° C. | 27 | 0.71 |
| Comparative Example 2 | 220° C. | 29 | 0.38 |
| Comparative Example 2 | 230° C. | 27 | 0.69 |
| Comparative Example 2 | 240° C. | 25 | 0.92 |

EXAMPLE 2

Production of Base Oil

Base oil was produced by performing hydrofinishing on product oil produced in the dewaxing process by using 55 ml of the catalyst produced in Example 1 under conditions of a hydrogen pressure of 160 Kgf/cm², a liquid hourly spaced velocity (LHSV) of 1.7 hr⁻¹, a H₂/raw material volume ratio (m³/m³) of 500, and a hydrofinishing process temperature of 230° C. A Saybolt color and ultraviolet absorbance at 325 nm of the produced base oil are summarized and shown in Table 2.

COMPARATIVE EXAMPLE 2

Base oil was produced in the same manner as that of Example 2, except that the catalyst (catalyst B) produced in Comparative Example 1 was used.

TABLE 2

| Catalyst | Process temperature | Saybolt color | UV absorbance at 325 nm |
|---|---|---|---|
| Example 2 | 230° C. | 30 | 0.07 |
| Comparative Example 2 | 230° C. | 30 | 0.21 |

Hereinabove, although the present invention has been described by specific matters, embodiments, and drawings, they have been provided only for assisting in the entire understanding of the present invention. Therefore, the present invention is not limited to the embodiments. Various modifications and changes may be made by those skilled in the art to which the present invention pertains from this description.

Therefore, the spirit of the present invention should not be limited to these embodiments, but the claims and all of modifications equal or equivalent to the claims are intended to fall within the scope and spirit of the present invention.

The invention claimed is:

1. A hydrofinishing catalyst comprising:
an amorphous silica-alumina support; and
a hydrogenated active metal supported on the support,
wherein composition uniformity defined as the following Expression 1 satisfies Expression 2, $$UN = \frac{\sum_{i=1}^{i=M} |C_{Al}(i) - C_{Al}(ave)|}{M \times C_{Al}(ave)} \times 100 \qquad \text{(Expression 1)}$$

in Expression 1, UN is composition uniformity, $C_{Al}$ is an Al composition having a total mass (wt %) of Al and Si as a denominator and a mass (wt %) of Al as a numerator, $C_{Al}(ave)$ is an average Al composition on a cross section of a support passing through the center of the support, $C_{Al}(i)$ is an Al composition at an i-th position of positions spaced apart from each other by a predetermined interval along a reference line and sequentially numbered, the reference line being a straight line passing through the center of the cross section of the support, and M is a total number of positions at which the Al composition is measured at the reference line, and is a natural number of 20 to 500, $$UN \leq 3.0, \text{ and} \qquad \text{(Expression 2)}$$

The catalyst satisfies the following Expression 4
(Expression 4)
Amount of Bronsted acid sites measured by adsorption of pyridine at 200° C.≥30 μmol/g.

2. The hydrofinishing catalyst of claim 1, wherein the catalyst satisfies the following Expression 3, $$5.00 \leq Pv(100-500)/Pv(10-500)*100 \qquad \text{(Expression 3)}$$

in Expression 3, Pv(10–500) is a total volume (cm³/g) of pores within a size range of 10 to 500 nm per unit mass of the catalyst, and Pv(100–500) is a total volume (cm³/g) of pores within a size range of 100 to 500 nm per unit mass of the catalyst.

3. The hydrofinishing catalyst of claim 1, wherein the catalyst has a strength of a Bronsted acid site satisfying the following Expression 5, Expression 6, or Expressions 5 and 6,
(Expression 5)
Amount of Bronsted acid sites measured by adsorption of pyridine at 300° C.≥25 μmol/g,
(Expression 6)
Amount of Bronsted acid sites measured by adsorption of pyridine at 400° C.≥10 μmol/g.

4. The hydrofinishing catalyst of claim 1, wherein the active metal is one or two or more metals belonging to Groups VI to VIII.

5. The hydrofinishing catalyst of claim 4, wherein the active metal contains Pd, Pt, or Pd and Pt.

6. The hydrofinishing catalyst of claim 4, wherein the catalyst contains a first active metal and a second active metal, and a weight ratio of the first active metal to the second active metal is 1.0:0.1 to 1.0.

7. The hydrofinishing catalyst of claim 1, wherein the catalyst contains 0.1 to 5 wt % of the active metal.

8. A method for producing base oil, comprising:
a step of dewaxing raw oil for producing base oil in the presence of an isomerization catalyst to obtain a catalytic dewaxed oil fraction; and
a step of hydrofinishing the catalytic dewaxed oil fraction using the hydrofinishing catalyst of claim 1 to produce base oil.

* * * * *

UNITED STATES PATENT AND TRADEMARK OFFICE
CERTIFICATE OF CORRECTION

| | | |
|---|---|---|
| PATENT NO. | : 11,400,435 B2 | Page 1 of 1 |
| APPLICATION NO. | : 17/289891 | |
| DATED | : August 2, 2022 | |
| INVENTOR(S) | : Dokyoung Kim et al. | |

It is certified that error appears in the above-identified patent and that said Letters Patent is hereby corrected as shown below:

On the Title Page

Under (71) Applicant:
Please add the second applicant name "SK ENMOVE CO., LTD."; and Under (73) Assignee:
Please add the second assignee name "SK ENMOVE CO., LTD., Seoul (KR)".

Signed and Sealed this
Fourth Day of April, 2023

Katherine Kelly Vidal
*Director of the United States Patent and Trademark Office*